United States Patent [19]

Krishnan et al.

[11] 4,448,930

[45] May 15, 1984

[54] POLYCARBONATE BLENDS HAVING AN IMPROVED IMPACT STRENGTH

[75] Inventors: Sivaram Krishnan, Moers, Fed. Rep. of Germany; Nelson R. Lazear, McMurray, Pa.

[73] Assignee: Mobay Chemical Corporation, Pittsburgh, Pa.

[21] Appl. No.: 404,066

[22] Filed: Aug. 2, 1982

[51] Int. Cl.$^3$ .............................................. C08L 69/00
[52] U.S. Cl. ...................................... 525/67; 525/133; 525/147
[58] Field of Search .......................................... 525/67

[56] References Cited

U.S. PATENT DOCUMENTS

| 3,879,348 | 4/1975 | Serini et al. | 260/47 X |
| 3,880,783 | 4/1975 | Serini et al. | 260/3 |
| 4,172,103 | 10/1979 | Serini et al. | 525/76 |
| 4,204,047 | 5/1980 | Margotte et al. | 525/67 |
| 4,205,141 | 5/1980 | Liebig et al. | 525/67 |
| 4,299,928 | 11/1981 | Witman | 525/67 |

Primary Examiner—Wilbert J. Briggs, Sr.
Attorney, Agent, or Firm—Gene Harsh; Lawrence S. Pope; Aron Preis

[57] ABSTRACT

Thermoplastic molding compositions characterized by their improved impact performance and deformation under load are disclosed comprising a homogeneous, intimate blend of a polycarbonate resin and a nuclear alkylated polycarbonate resin wherein blend dispersed is a polymeric modifier.

4 Claims, No Drawings

POLYCARBONATE BLENDS HAVING AN IMPROVED IMPACT STRENGTH

FIELD OF THE INVENTION

The invention is directed to polycarbonate blends and more particularly to blends comprising nuclear-alkylated polycarbonates.

DESCRIPTION OF THE PRIOR ART

Polycarbonates derived from reactions involving organic dihydroxy compounds and carbonic acid derivatives have found extensive commercial application because of their excellent mechanical and physical properties. These thermoplastic polymers are particularly suited for the manufacture of molded products where impact strength, rigidity, toughness, thermal and dimensional stability as well as excellent electrical properties are required.

Alkylated aromatic polycarbonates such as are described in U.S. Pat. No. 3,879,348, which is incorporated herein by reference, are generally noted for their resistance to saponification, to hydrolysis and to aminolysis. Further, these polycarbonate resins exhibit a remarkably high resistance to deformation under load at elevated temperature as evidenced by their performance when tested according to ASTM D-648.

On the other hand, the alkylated aromatic polycarbonate resins entailed in the present invention exhibit a distinct brittle failure when subject to relatively low impact stress. In this connection, the art is noted to include Ser. No. 336,211 filed Dec. 31, 1981 wherein disclosed are impact modifications of nuclear-alkylated homopolycarbonates.

Further of interest is U.S. Pat. No. 4,299,928 wherein disclosed are impact modified polycarbonate compositions comprising an acrylate-based graft copolymer, and U.S. Pat. No. 4,172,103 wherein blends comprising nuclear-alkylated polycarbonates are disclosed and improvement in their impact performance is noted upon the admixing of certain synthetic rubbers therewith. Also of interest in the present context are U.S. Pat. Nos. 3,880,783, 4,204,047 and 4,205,141 wherein disclosed are compositions comprising nuclear-alkylated polycarbonates in admixture with certain rubbers.

SUMMARY OF THE INVENTION

Thermoplastic molding compositions characterized by their improved impact performance and deformation under load are disclosed comprising a homogeneous, intimate blend of a polycarbonate resin and a nuclear-alkylated polycarbonate resin wherein blend dispersed is a polymeric modifier.

DETAILED DESCRIPTION OF THE INVENTION

The thermoplastic compositions of the present invention comprise:
(i) a polycarbonate resin
(ii) a nuclear-alkylated polycarbonate resin and
(iii) a polymeric modifier.
Preferably, the composition comprises between about 10 to about 90, more preferably 20 to about 50 weight percent of the polycarbonate resin, between 90 to about 10, more preferably 20 to about 50 weight percent of the nuclear-alkylated polycarbonate resin, the weight percentages being related to the total weight of (i) and (ii) above. The polymeric modifier is present in accordance with the invention at a level of between about 15 and about 50, preferably between about 20 and about 40 phr (per hundred resin) in relation to the weight of (i)+(ii).

In the present context, polycarbonate resins may have a molecular weight (weight average) of about 10,000 to about 200,000, preferably about 20,000 to about 80,000, and may have a melt flow rate, per ASTM D-128 at 300° C., of about 1 to about 24 gm/10 minutes, preferably about 2–6 gm/10 minutes.

In the present context, bisphenols suitable for the preparation of the polycarbonates of the invention conform to the structural formulae (1) or (2)

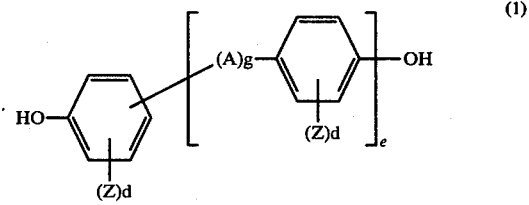

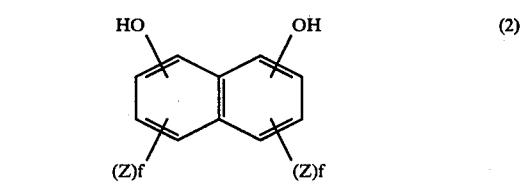

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, an —SO— or —SO₂— radical; a radical of the general formula

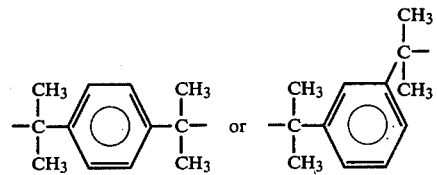

g denotes the number 0 or 1;
e denotes the number 0 or 1;
Z denotes F, Cl or Br and if several Z radicals are substituents in one aryl radical, they may be identical or different; d denotes 0 or an integer of from 1 to 4; and f denotes 0 or an integer from 1 to 3.

Among the useful bisphenols in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)diisopropylbenzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French Patent Specification No. 1,561,518 and in the monograph, H. Schnell, *Chemistry and Physics of Polycarbonates*, Interscience Publishers, New York, 1964. Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-chloro-4-hydroxyphenyl)-propane, hydroxybenzophenone and 4,4'-sulfonyl diphenol.

The most preferred bisphenol is 2,2-bis-(4-hydroxyphenyl)-propane (bisphenol A).

The polycarbonates of the invention may entail in their structure units derived from one or more of the suitable bisphenols.

The preparation of polycarbonate resins may be carried out in accordance with any of the processes known in the art, for example by the interfacial polycondensation process, polycondensation in a homogeneous phase or by transesterification. The suitable processes and the associated reactants, catalysts, solvents and conditions have been disclosed in the literature and in general are described in the abovementioned monograph by H. Schnell.

The nuclear-alkylated polycarbonate resins of the invention are characterized in that the structural units of formula (3)

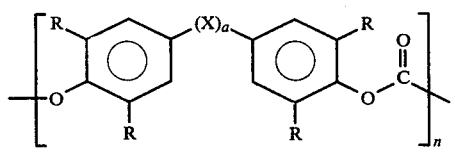

(3)

wherein
R is —CH₃, —C₂H₅ or —CH(CH₃)₂ and
X is an alkylene or an alkylidene group having 1 to 5 carbon atoms, a cycloalkylene or a cycloalkylidene radical with 5 to 15 carbon atoms, an ether bond or a keto bond,
n is at least 55 and
a is 0 or 1
comprise at least 5, preferably between 10 and 100 percent relative to the weight of the nuclear-alkylated resin. Other units, where applicable, may be carbonate derivatives of any of the bisphenols of formula (1) or (2) above. The preferred embodiment of the present invention entails a homopolymer of the nuclear-alkylated polycarbonate wherein substantially all the structural units conform to formula 3.

The polycarbonate resins of formula 3 above, their properties and method of preparation have been described in U.S. Pat. No. 3,879,348, incorporated by reference herein. Briefly, they may be obtained by a reaction of the corresponding nuclear-alkylated bisphenols with phosgene or with the bischlorocarbonic acid esters of the nuclear-alkylated bisphenols in accordance with the phase boundary polycondensation process and are characterized in that their molecular weight is between 15,000 and 200,000.

In the preparation of the polycarbonate resins and/or of the nuclear-alkylated polycarbonates of the invention, monofunctional reactants such as monophenols may be used in order to limit their respective molecular weights. Also, in the preparation of either or both, branching agents may be employed. Branching may be obtained by the incorporation, in the respective processes, of small amounts, preferably of between about 0.05 and 2.0 mol % (relative to diphenols employed), of trifunctional or more than trifunctional compounds, especially, compounds having three or more phenolic hydroxyl groups.

Polycarbonates of this type are described, for example, in German Offenlegungsschriften (German Published Specifications) Nos. 1,570,533; 1,595,762; 2,116,974 and 2,113,347, British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-tri-methyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4"-dihydroxytriphenyl)-methyl)benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

The polymeric modifier phase useful in the context of the present invention may be any of acrylate graft polymers or copolymers, certain grafts of butadiene polymers or copolymers and certain thermoplastic elastomers having at least two terminal resinous blocks and a central diene block. Among the acrylate graft polymers suitable in the practice of the invention are the acrylic rubber interpolymer composites which are described in U.S. Pat. Nos. 3,808,180 and 4,096,202, both incorporated by reference herein. Briefly, the technology described therein is that of the preparation of a specific class of multiphase compounds. These are compositions comprising about 25 to 95% by weight of a first elastomeric phase and about 75 to 5% by weight of a second, rigid, thermoplastic phase. The first phase is polymerized from about 75 to 99.8% by weight $C_1$ to $C_6$ acrylate resulting in an acrylic rubber core having a glass transition temperature below about 10° C. which is cross-linked with 0.1 to 5% by weight of a cross-linking monomer and to which is added 0.1 to 5% by weight of a graft-linking monomer.

The preferred alkyl acrylate is butyl acrylate. The cross-linking monomer is a polyethylenically unsaturated monomer having a plurality of addition polymerizable reactive groups all of which polymerize at substantially the same rate of reaction. Suitable cross-linking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred cross-linking monomer is butylene diacrylate. The graft-linking monomer is a polyethylenically unsaturated monomer having a plurality of addition polymerizable reactive groups, at least one of which polymerizing at a substantially different rate of polymerization from at least one other of said reactive groups. The function of the graft-linking monomer is to provide a residual level of unsaturation in the elastomeric phase, particularly in the latter stages of polymerization and, consequently, at or near the surface of the elastomer particles. The preferred graft-linking monomer is allyl methacrylate and diallyl maleate.

The final stage monomer system can be comprised of $C_1$ to $C_{16}$ methacrylate, styrene, acrylonitrile, alkyl acrylates, allyl methacrylate, diallyl methacrylate, and the like, as long as the over Tg is at least 20° C. Preferably, the final stage monomer system is at least 50 weight % $C_1$ to $C_4$ alkyl methacrylate. It is further preferred that the final stage polymer be free of units which tend to degrade polycarbonate.

In a preferred embodiment of the present invention the acrylate graft polymer is an acrylic rubber interpolymer composite which is available commercially from the Rohm & Haas Corporation, Philadelphia, Pa. under the trade name Acryloid ® KM-330. That modifier is characterized in that its acrylic rubber core comprises n-butyl acrylate and in that its crosslinking agent is 1,3-butylene diacrylate, and in that its graft-linking agent is diallyl maleate and in that the second phase monomeric system of which is methyl methacrylate.

Additional suitable acrylate graft copolymers are those described in U.S. Pat. No. 4,022,748, incorporated by reference herein.

Among the suitable grafts of butadiene are polybutadiene or butadiene-styrene or butadiene-acrylonitrile which may be at least partially cross-linked and which are grafted with styrene and methyl methacrylate. Examples of the suitable butadiene graft copolymers are those available in commerce under the trade name Paralord ® KM 611 and KM 228, both from Rohm & Haas Corporation, Philadelphia, Pa., Kane Ace ® B28, B22 and B56 from Kanegafuchi Chemicals of Osaka, Japan. The thermoplastic elastomers having block structure which are suitable in the present invention have been described in U.S. Pat. No. 4,173,597 incorporated herein by reference. Essentially that impact modifier is a thermoplastic elastomer having at least two terminal resinous blocks and a central diene block. These polymers can be referred to as ABA polymers having a block linear structure produced by sequential polymerization of A (a monovinyl-substituted aromatic compound) followed by the B segment (a conjugated diene) followed by another A. Alternatively they can be described as $(AB)_nY$ wherein A and B are as described above, n is a number of at least 2 and Y is the residue of a polyfunctional initiator or a polyfunctional coupling agent. The diene portion causes the thermoplastic elastomer to have elastomeric properties and the terminal resinous blocks apparently form crystal structures which serve the same function as chemical cross-linking to give rubbery material having the strength characteristics normally associated with cured rubber.

The particular thermoplastic elastomers for use in this invention are those which preferably have a weight ratio of polymerized conjugated diene/polymerized monovinyl-substituted aromatic compound within the range of 60/40 to 75/25, most preferably a ratio of about 70/30. The preferred dienes are 1,3-butadiene and isoprene, 1,3-butadiene is most preferred. Styrene is the preferred monovinyl-substituted aromatic compound. These modifiers must have a melt flow rate of between 2-15 at 180° C., when measured according to ASTM D-1238-65T with a 5 kg weight. Among these, the most suitable are K-resins available as KR03 resin from Phillips Petroleum Co. The compositions in accordance with the invention may be prepared by intimately blending the components thereof using any of the means known in the art to be suitable for preparing homogeneous dispersions, such as kneaders, single or twin screw extruder mills and the like.

The compositions in accordance with the present invention may contain additives and reinforcement agents such as glass fibers and the like, fillers such as talc, clay and the like and/or any of the pigments, dyes, UV stabilizers, mold release agents or combinations thereof. It should be noted that the improved level of notched impact strength, the reduction in notch sensitivity, of the compositions of the invention is obtained without resort to any additional impact modifiers.

The invention is demonstrated by the following examples.

EXAMPLES

Examples 1-11

Compositions according to the invention were prepared and tested as their properties are shown in Table 1. The nuclear-alkylated polycarbonate (MPC) used in the preparation of the compositions described herein is one having a structural formula corresponding to (3) above wherein R is $CH_3$ and wherein X is propylidine and is characterized in that its melt flow rate is 2.6 gm/10 min., and in that its relative viscosity (as measured in a 0.5% strength solution in methylene chloride) is 1.26—corresponding to an approximate molecular weight of about 16,000. The polycarbonate resin was Merlon M-50, a homopolycarbonate having a melt flow index of about 3.0 gm/10 min., available from Mobay Chemical Corporation, Pittsburgh, Pa. The dispersed phase of impact modifier was Acryloid ® KM-330 from Rohm & Haas (Examples 1-6). The comparative examples (7-8) made use of a butadiene based graft Kane-Ace ® B56 from Kanegafuchi Chemicals, Osaka, Japan. Examples 9-11 are presented for comparison.

The components in each case were blended in an 1½" Waldron Hartig (2.75/1 mixing screw) extruder at a standard temperature profile for polycarbonates.

The compositions were injection molded into test specimens and their respective properties determined as shown in Table 1.

| Example | Resin Composition[1] (PC/MPC) | Added Modifier[2] (phr) | Impact Strength (ft. lb./in.) Notched Izod | | HDT @264 psi (°C.) |
| --- | --- | --- | --- | --- | --- |
| | | | ⅛" | ¼" | |
| 1 | 10/90 | 20[2] | 4.52 | 3.71 | 170.2 |
| 2 | 20/80 | 20[2] | 5.79 | 4.45 | 160.7 |
| 3 | 30/70 | 20[2] | 8.67 | 4.97 | 163.6 |
| 4 | 40/60 | 20[2] | 10.57 | 5.81 | 156.7 |
| 5 | 50/50 | 20[2] | 9.55 | 6.43 | 152.4 |
| 6 | 50/50 | 25[2] | 9.92 | 6.47 | 142.4 |
| 7 | 50/50 | 15[3] | 3.20 | 2.69 | 146 |
| 8 | 50/50 | 25[3] | 2.75 | 2.59 | 132 |
| 9 | 75/25 | — | 1.38 | 0.84 | 153.9 |
| 10 | 50/50 | — | 0.79 | 0.91 | 150.4 |
| 11 | 25/75 | — | 0.50 | 0.58 | 159.1 |

[1]The resin blend of nuclear-alkylated polycarbonate and Merlon M-50 at the noted weight ratio.
[2]The modifier added was Acryloid KM-330 except as noted.
[3]Kane Ace B-56 impact modifier.

Examples 12-14

Further compositions in accordance with the invention were prepared and their properties determined as described below. Merlon M-50 polycarbonate resin and MPC as described above were blended with an impact modifier—rubber graft polymer—K-resin from Phillips Petroleum at the relative amounts shown below. The blends were first extruded at a temperature profile 550, 540, 530, 520 (r→f) at 60 rpm on a 1½" WH extruder, 2.75:1 screw. Injection molding was carried out at 500° F., and mold temperature of 200° F.

| Example | Resin Composition (PC/MPC) | Added Modifier (phr) | Impact Strength (ft. lb./in.) Notched Izod ⅛" | ¼" | HDT @264 psi (°C.) |
|---|---|---|---|---|---|
| 12 | 50/50 | 11.11 | 1.8 | 2.2 | 150 |
| 13 | 50/50 | 33.2 | 5.8 | 3.4 | 141 |
| 14 | 50/50 | 100.0 | 9.5 | 7.4 | 91 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
(i) a blend of an aromatic polycarbonate resin and a nuclear alkylated polycarbonate resin said blend characterized in that it consists of about 10 to about 90 percent relative to the weight of the blend of an aromatic polycarbonate resin based on one or more of the bisphenols conforming to the structural formula (1) and/or (2)

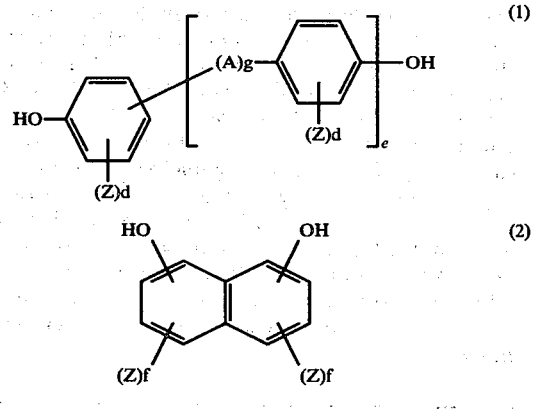

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, an —SO— or —SO₂— radical or a radical of the general formula

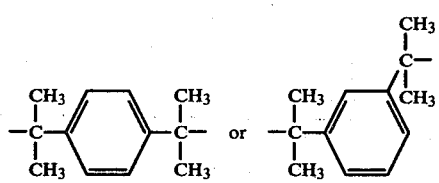

g denotes 0 or 1;
e denotes 0 or 1;
Z denotes F, Cl or Br and if several Z radicals are substituents in one aryl radical, they may be identical or different;
d denotes 0 to 4; and
f denotes 0 to 3,
and about 90 to 10 percent relative to the weight of said blend of a nuclear-alkylated polycarbonate resin characterized in that structural units of formula (3)

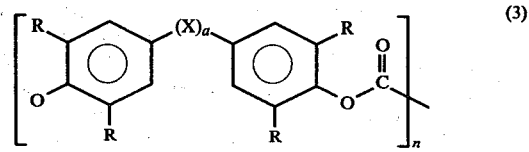

wherein
R is —CH₃, —C₂H₅ or —CH(CH₃)₂ and
X is an alkylene or an alkylidene group having 1 to 5 carbon atoms, a cycloalkylene or a cycloalklidene radical with 5 to 15 carbon atoms, an ether bond or a keto bond,
n is at least 55 and
a is 0 or 1
comprise at least 5 percent relative to the weight of said nuclear-alkylated resin and
(ii) an acrylic rubber interpolymer composite comprising 25 to 95 percent by weight of a first elastomeric phase polymerized from about 75 to 99.8 percent by weight of C₁ to C₆ acrylate, 0.1 to 5 percent by weight of a cross-linking monomer and 0.1 to 5 percent by weight of a graft-linking monomer and about 75 to about 5 percent by weight of a second rigid thermoplastic phase, said acrylic rubber interpolymer composite being present at an amount of between 15 and about 50 phr in relation to the weight of said blend.

2. The composition of claim 1 wherein said acrylate is butyl acrylate.

3. A thermoplastic molding composition comprising
(i) a blend of an aromatic polycarbonate resin and a nuclear alkylated polycarbonate resin said blend characterized in that it consists of about 10 to about 90% relative to the weight of the blend of an aromatic polycarbonate resin based on bisphenol A and about 90 to 10% relative to the weight of said blend of a nuclear alkylated polycarbonate resin characterized in that its structural formula corresponds to

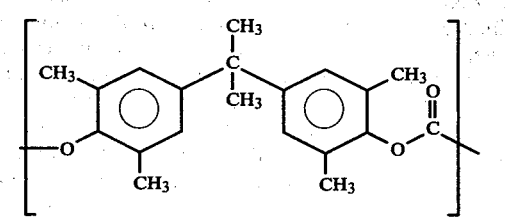

and
(ii) an acrylic rubber interpolymer composite comprising 25 to 95 percent by weight of a first elastomeric phase polymerized from about 75 to 99.8 percent by weight of C₁ to C₆ acrylate, 0.1 to 5 percent by weight of a crosslinking monomer and 0.1 to 5 percent by weight of a graft-linking monomer and about 75 to about 5 percent by weight of a second rigid thermoplastic phase, said acrylic rubber interpolymer composite being present at an amount of between 15 and about 50 phr in relation to the weight of said blend.

4. The molding composition of claim 3 wherein said (ii) is present at an amount of between 20 and about 25% relative to the weight of said composition.